(12) United States Patent
Kleveland et al.

(10) Patent No.: US 11,545,040 B2
(45) Date of Patent: Jan. 3, 2023

(54) MUM-T ROUTE EMPHASIS

(71) Applicant: Rockwell Collins, Inc., Cedar Rapids, IA (US)

(72) Inventors: James Kleveland, Marion, IA (US); Korey Breger, Coralville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/229,585

(22) Filed: Apr. 13, 2021

(65) Prior Publication Data

US 2022/0326821 A1    Oct. 13, 2022

(51) Int. Cl.
| G08G 5/00 | (2006.01) |
| G06F 3/0484 | (2022.01) |
| B64D 43/00 | (2006.01) |
| G06F 3/0482 | (2013.01) |
| G06F 3/0488 | (2022.01) |

(52) U.S. Cl.
CPC ........... *G08G 5/0069* (2013.01); *B64D 43/00* (2013.01); *G06F 3/0482* (2013.01); *G06F 3/0484* (2013.01); *G06F 3/0488* (2013.01); *G08G 5/0082* (2013.01)

(58) Field of Classification Search
None
See application file for complete search history.

(56) References Cited

U.S. PATENT DOCUMENTS

| 9,927,807 B1 * | 3/2018 | Ganjoo ................. H04W 76/15 |
| 9,965,962 B1 * | 5/2018 | X ........................ G08G 5/0082 |
| 9,977,428 B2 * | 5/2018 | Hall ....................... G05D 1/106 |
| 10,147,000 B2 | 12/2018 | Pupalaikis et al. |
| 10,168,695 B2 * | 1/2019 | Barnickel ............... H04L 67/12 |

(Continued)

FOREIGN PATENT DOCUMENTS

WO    2019161662 A1    8/2019

OTHER PUBLICATIONS

Lim, Yixiang & Pongsakornsathien, Nichakorn & Gardi, Alessandro & Sabatini, Roberto & Kistan, Trevor & Ezer, Neta & Bursch, Daniel. (2021). Adaptive Human-Robot Interactions for Multiple Unmanned Aerial Vehicles. Robotics. 10. 12. 10.3390/robotics10010012. (Year: 2021).*

(Continued)

*Primary Examiner* — William L Bashore
*Assistant Examiner* — Nathan K Shrewsbury
(74) *Attorney, Agent, or Firm* — Suiter Swantz pc llo

(57) ABSTRACT

A computer apparatus includes a touchscreen display. The computer apparatus generates a graphical user interface on the touchscreen display and receive user inputs via the touchscreen display. The graphical user interface includes symbology representing a flight path of multiple unmanned teamed assets from a current position to a current objective. The graphical user interface also includes symbology representing a card associated with each of the unmanned teamed assets. By the touchscreen display, an operator selects one of the unmanned teamed assets, for emphasis of the flight path. The flight paths of the non-selected unmanned teamed assets remain displayed when the selected flight path is emphasized. The operator may select the unmanned teamed asset by the flight path or by the unmanned teamed asset card.

13 Claims, 4 Drawing Sheets

(56) References Cited

U.S. PATENT DOCUMENTS

| | | | |
|---|---|---|---|
| 10,216,367 B1* | 2/2019 | Patel | G08G 5/0021 |
| 10,380,801 B1 | 8/2019 | Flaherty-Woods et al. | |
| 10,395,542 B2* | 8/2019 | Yakan | G08G 5/006 |
| 10,532,814 B2 | 1/2020 | Chapman et al. | |
| 10,732,648 B2* | 8/2020 | Crockett | G05D 1/104 |
| 2005/0230563 A1* | 10/2005 | Corcoran, III | G05D 1/104 |
| | | | 244/175 |
| 2012/0143488 A1* | 6/2012 | Othmezouri | G06V 20/58 |
| | | | 701/301 |
| 2013/0200207 A1* | 8/2013 | Pongratz | B64C 39/024 |
| | | | 244/2 |
| 2013/0218373 A1* | 8/2013 | Hedrick | G06F 3/04847 |
| | | | 701/14 |
| 2014/0018979 A1* | 1/2014 | Goossen | G05D 1/0044 |
| | | | 701/3 |
| 2014/0257692 A1* | 9/2014 | Stefani | G01C 21/00 |
| | | | 701/519 |
| 2016/0140851 A1* | 5/2016 | Levy | G08G 5/0034 |
| | | | 701/410 |
| 2016/0189549 A1* | 6/2016 | Marcus | G08G 5/0008 |
| | | | 701/3 |
| 2016/0210008 A1* | 7/2016 | Nakao | G06F 3/04892 |
| 2016/0216072 A1* | 7/2016 | McNeil | F41G 3/02 |
| 2016/0343260 A1* | 11/2016 | Branthomme | B64D 43/00 |
| 2017/0076159 A1* | 3/2017 | Pupalaikis | B64C 39/024 |
| 2017/0129603 A1* | 5/2017 | Raptopoulos | G08G 5/0069 |
| 2017/0137125 A1* | 5/2017 | Kales | B64C 39/024 |
| 2017/0192418 A1* | 7/2017 | Bethke | G08G 5/0086 |
| 2017/0233053 A1* | 8/2017 | High | B64C 39/024 |
| | | | 244/2 |
| 2017/0263131 A1* | 9/2017 | Blomberg | G08G 5/0039 |
| 2017/0263133 A1* | 9/2017 | Blomberg | G08G 5/0039 |
| 2017/0295609 A1* | 10/2017 | Darrow | H04W 84/18 |
| 2018/0098227 A1* | 4/2018 | Carnelli | H04W 4/029 |
| 2018/0102057 A1* | 4/2018 | Lo | G05D 1/106 |
| 2018/0108260 A1* | 4/2018 | Kuhara | G08G 5/0047 |
| 2018/0273050 A1* | 9/2018 | Tertoolen | G06F 3/013 |
| 2018/0275647 A1* | 9/2018 | Li | G05D 1/0044 |
| 2018/0364713 A1* | 12/2018 | Foster, II | G08G 5/0043 |
| 2019/0025819 A1 | 1/2019 | Ferguson et al. | |
| 2019/0220042 A1* | 7/2019 | Guo | G08G 5/0013 |
| 2019/0227683 A1* | 7/2019 | Suvitie | G06F 3/0484 |
| 2019/0244429 A1* | 8/2019 | Flaherty-Woods | G06T 19/006 |
| 2019/0260768 A1* | 8/2019 | Mestha | H04L 63/1466 |
| 2019/0325760 A1* | 10/2019 | Priest | G08G 5/0069 |
| 2020/0042019 A1 | 2/2020 | Marczuk et al. | |
| 2020/0090527 A1* | 3/2020 | Priest | G08G 5/0039 |
| 2020/0168104 A1* | 5/2020 | Holder | G08G 5/0039 |
| 2020/0183429 A1* | 6/2020 | Ottenheimer | B64C 39/024 |
| 2020/0219407 A1* | 7/2020 | Priest | G08G 5/0082 |
| 2020/0349852 A1* | 11/2020 | DiCosola | G06Q 20/20 |
| 2020/0401162 A1 | 12/2020 | Lisewski et al. | |
| 2021/0046929 A1* | 2/2021 | Wu | G08G 1/0968 |
| 2021/0065560 A1* | 3/2021 | Ali | G07C 5/008 |
| 2021/0191392 A1* | 6/2021 | Talavera | B64C 13/04 |
| 2021/0197966 A1* | 7/2021 | Zhang | G08G 5/0008 |
| 2021/0263537 A1* | 8/2021 | Belt | G08G 5/0039 |
| 2021/0264800 A1* | 8/2021 | Gia | H04L 9/3236 |
| 2021/0276735 A1* | 9/2021 | Raptopoulos | G08G 5/025 |
| 2021/0295715 A1* | 9/2021 | Gia | G08G 5/0069 |

OTHER PUBLICATIONS

Andrew S. Clare, Pierre C. P. Maere, and M. L. Cummings. 2012. Assessing operator strategies for real-time replanning of multiple unmanned vehicles. Int. Dec. Tech. 6, 3 (Aug. 2012), 221-231. (Year: 2012).*

Donmez, B., C. Nehme, and M.L. Cummings. "Modeling Workload Impact in Multiple Unmanned Vehicle Supervisory Control." Systems, Man and Cybernetics, Part A: Systems and Humans, IEEE Transactions On 40.6 (2010) : 1180-1190. © 2010 IEEE. (Year: 2010).*

* cited by examiner

MUM-T ROUTE EMPHASIS

GOVERNMENT LICENSE RIGHTS

This invention was made with government support under Contract Number 20180628YLC1 awarded by the Department of Defense. The government has certain rights in the invention.

BACKGROUND

A factor contributing to the complexity of current and future battlespaces is manned unmanned teaming (MUM-T) operations. MUM-T operations describe a scenario in which a human operator (e.g., in an airborne platform or a platform on the ground) is controlling one or more unmanned platforms (e.g., unmanned vehicles). The operator is often task saturated, due to various high intensity scenarios in which the operator may be placed. The operator must also manage multiple sensor information feeds and vehicle interface to perform mission responsibilities. MUM-T further complicates the human factors. Therefore, it would be advantageous to provide a device, system, or method that cures the shortcomings described above.

SUMMARY

A computer apparatus is disclosed, in accordance with one or more embodiments of the present disclosure. In one illustrative embodiment, the computer apparatus includes at least one processor. In another illustrative embodiment, the computer apparatus includes a communication interface coupled with the processor. In another illustrative embodiment, the communication interface may be configured to receive information regarding a plurality of unmanned teamed assets and transmit the information to the at least one processor. In another illustrative embodiment, the computer apparatus includes a touchscreen display connected to the processor. In another illustrative embodiment, the computer apparatus includes a memory in communication with the processor. In another illustrative embodiment, the memory stores processor executable code for configuring the at least one processor. In another illustrative embodiment, the processor is configured, based on the processor executable code, to generate a graphical user interface for the touchscreen display. In another illustrative embodiment, the graphical user interface includes symbology associated with each of the plurality of unmanned teamed assets. In another illustrative embodiment, the symbology includes a current objective for each of the plurality of unmanned teamed assets. In another illustrative embodiment, the symbology includes a current flight path for each of the plurality of unmanned teamed assets. In another illustrative embodiment, the processor is configured, based on the processor executable code, to receive a user input of a selected unmanned teamed asset of the plurality of unmanned teamed assets from the touchscreen display. In another illustrative embodiment, the processor is configured, based on the processor executable code, to emphasize, on the touchscreen display, at least the current flight path associated with the selected unmanned teamed asset. In another illustrative embodiment, the symbology associated with the plurality of unmanned teamed assets remains displayed on the touchscreen display while the current flight path associated with the selected unmanned teamed asset is emphasized.

A method is disclosed, in accordance with one or more embodiments of the present disclosure. In one illustrative embodiment, the method includes generating a graphical user interface for a touchscreen display. In another illustrative embodiment, the graphical user interface includes symbology associated with each of a plurality of unmanned teamed assets. In another illustrative the symbology associated with each of the unmanned teamed assets includes a current objective. In another illustrative the symbology associated with each of the unmanned teamed assets includes a current flight path. In another illustrative embodiment, the method includes receiving a user input of a selected unmanned teamed asset of the plurality of unmanned teamed assets from the touchscreen display. In another illustrative embodiment, the method includes emphasizing, on the touchscreen display, at least the current flight path associated with the selected unmanned teamed asset. In another illustrative embodiment, the symbology associated with each of the plurality of unmanned teamed assets remains displayed on the touchscreen display while the at least the current flight path associated with the selected unmanned teamed asset is emphasized.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
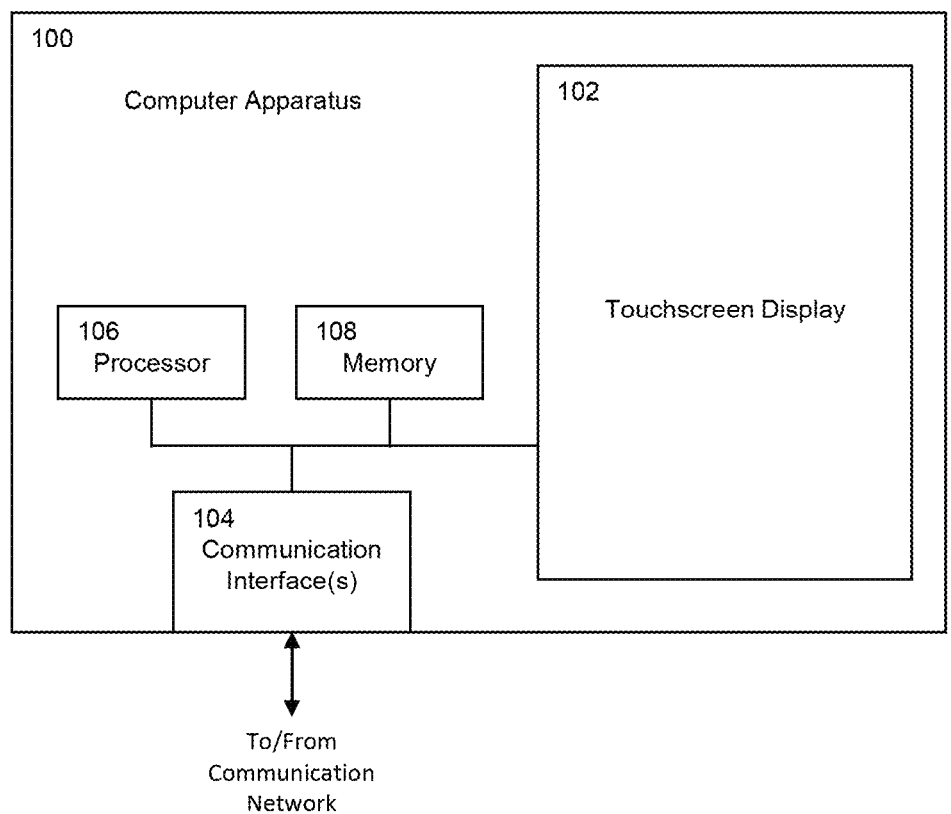
FIG. 1 depicts a schematic diagram of a computer apparatus, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise. Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

An asset may refer to vehicles (manned vehicles and/or unmanned vehicles), such as, but not limited to, aircraft (e.g., manned aircraft and/or unmanned aerial systems (UAS)), spacecraft, ground vehicles, ships, soldiers, military installations, and the like. Likewise, teamed assets may refer to friendly assets. Thus, an unmanned teamed asset may refer to a vehicle (e.g., the UAS) which includes no human crew physically present, which is also a friendly asset. In embodiments, the unmanned teamed asset may include any unmanned aerial system known in the art or any future unmanned aerial system.

Reference will now be made in detail to the subject matter disclosed, which is illustrated in the accompanying drawings. Broadly, embodiments of the present disclosure are directed to a computer apparatus. The computer apparatus enables route emphasis of unmanned teamed assets to improve operator situational awareness in a MUM-T scenario. In embodiments, a graphical user interface is generated on a touchscreen display of the computer apparatus for displaying various symbology associated with the unmanned teamed assets. A user input may then be received via the touchscreen display. In response to the user input, an unmanned teamed asset path may be emphasized. In some embodiments, the user input includes selecting an unmanned teamed asset card. In other embodiments, the user input includes selecting a current path or a future path of the unmanned teamed asset.

Referring to FIG. 1, a computer apparatus 100 is described, in accordance with one or more embodiments of the present disclosure. By the computer apparatus 100, an operator may be provided with an intuitive interface to manage MUM-T operations. The computer apparatus 100 may be part of a handheld electronic device, such as a tablet computer (e.g., iOS, Android, Windows, and Linux based tablets, Apple iPad, etc.), and may be wired or wirelessly connect to various electronics of an aircraft. Alternatively, the computer apparatus 100 may be integrated into an aircraft control center as one or more of a primary flight display (PFD), a multi-function display (MFD), or a heads-up display. Thus, an operator (e.g., a pilot, co-pilot, or other user) may view symbology associated with unmanned teamed assets by the computer apparatus 100.

The computer apparatus 100 may include the touchscreen display 102, a communication interface 104, a processor 106, and a memory 108. One or more of the touchscreen display 102, the communication interface 104, the processor 106, and the memory 108 may be communicatively coupled by a control bus. For example, the communication interface 104 may be coupled with the processor 106 for transmitting and receiving various information or signals.

The touchscreen display 102 may provide an operator a means for enhanced battlespace management and an intuitive interface to view MUM-T operations. The touchscreen display 102 may allow the operator to view MUM-T operations without a significant increase in workload. For example, the touchscreen display 102 may be configured to display a user interface including various symbology associated with multiple unmanned teamed assets, as will be described further herein. The touchscreen display 102 may include a touch sensitive surface which is configured to receive an input. Thus, the touchscreen display 102 may allow a user to interact with the computer apparatus 100, including through the execution of stored procedures. The touchscreen display 102 may be configured to display various symbology. The touchscreen display 102 may include a monochrome display or a color display for displaying the symbology.

The communication interface 104 may be configured to receive information regarding a plurality of unmanned teamed assets. For example, the communication interface 104 may be coupled with one or more of a flight management system, aircraft controllers, or data sources. By the communication interface 104, the computer apparatus 100 may be in communication with various avionics systems to receive information associated with the unmanned teamed assets. The communication interface 104 may include any suitable interface for interfacing with a communication network (e.g., a communication network of an aircraft), such as, but not limited to, a wired or a wireless network interface. The communication interface 104 may include mechanical, electrical, or signaling circuitry for communicating information to and from an aircraft communication network (e.g., Common Avionics Architecture System (CAAS)) and subsequently to various other sensors, components, and aircraft systems via a suitable communication link, such as, but not limited to, a Link 16 standard. In embodiments, the communication interface 104 may also be configured to transmit information regarding a plurality of unmanned teamed assets to the processor 106. The communication interface 104 may also be configured store and retrieve such information in the memory 108. For example, the communication interface 104 may be communicatively coupled with the processor 106 and/or the memory 108 for storing and retrieving information from the memory 108.

The processor 106 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the processor 106 may include any device configured to execute algorithms and/or instructions (e.g., program instructions stored in memory 108). Further, the steps described throughout the present disclosure may be carried out by a single processor 106 or, alternatively, multiple processors 106.

The memory 108 may include any storage medium known in the art suitable for storing the program instructions executable by the processor 106. For example, the memory 108 may include a non-transitory memory medium. By way of another example, the memory 108 may include, but is not limited to, a read-only memory (ROM), a random-access memory (RAM), a magnetic or optical memory device (e.g., disk), a magnetic tape, a solid-state drive and the like. It is further noted that memory 108 may be housed in a common controller housing with the processor 106. The memory 108 may include program instructions stored on the memory 108, which are configured to be executed by the processor 106. For example, the processor 106 may be configured to, by one or more program instructions maintained on the memory 108, generate a graphical user interface on the touchscreen display 102, receive a user input from the touchscreen display 102, and update the graphical user interface in response to the user input, the updated graphical user interface including an emphasis of a selected unmanned teamed asset.

Figure 2:
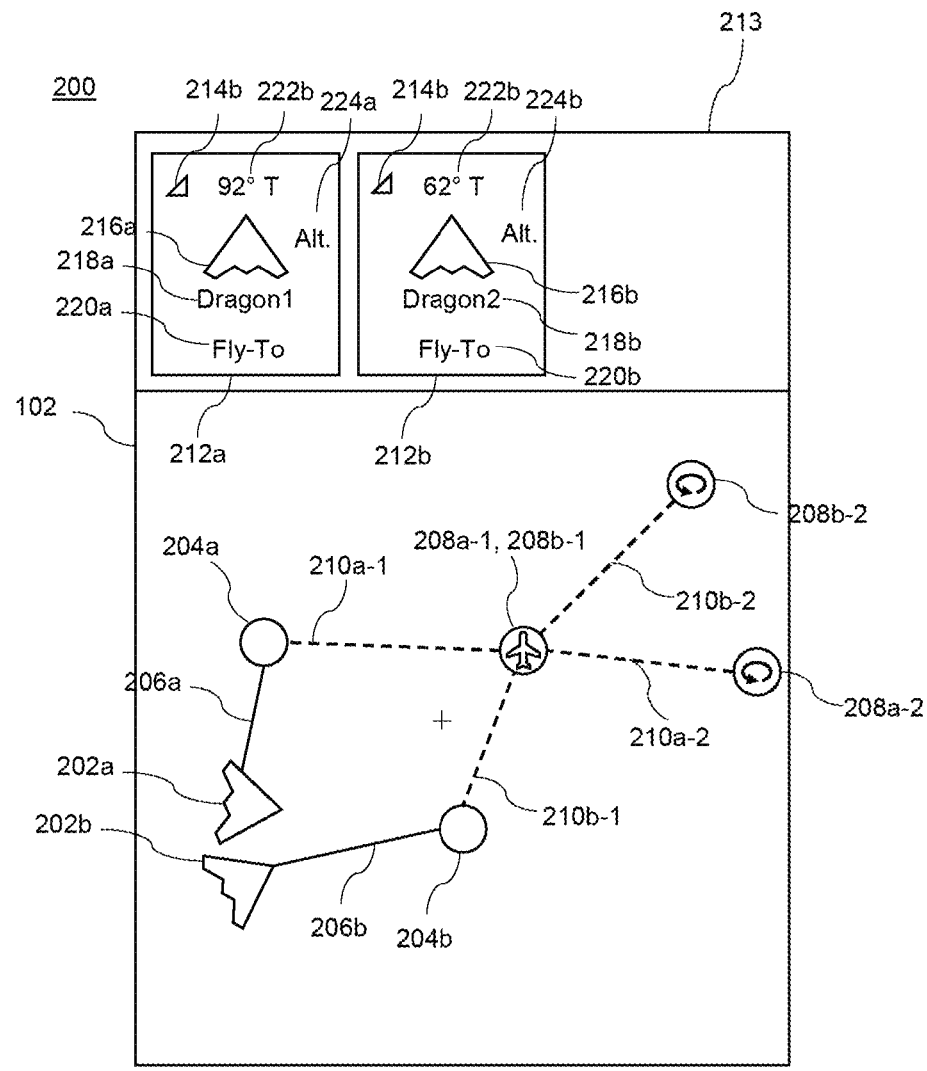
FIG. 2 depicts a graphical user interface of a display, in accordance with one or more embodiments of the present disclosure.

Referring now to FIG. 2, a graphical user interface 200 displayed by the touchscreen display 102 is described, in accordance with one or more embodiments of the present disclosure. Symbology associated with the unmanned teamed assets 202 (e.g., unmanned teamed assets 202*a*, 202*b*, etc.) may be displayed by the touchscreen display 102. For example, the unmanned teamed asset 202 may be displayed based on a current position and heading of the unmanned teamed assets. Although the unmanned teamed assets 202*a*, 202*b* are depicted with symbology indicative of a flying wing design, this is not intended as a limitation on the present disclosure. Preferably, the unmanned teamed asset 202 symbology will provide an indication of a type of the unmanned teamed asset 202 to the operator, although this also is not intended as a limitation on the present disclosure. In this regard, the unmanned teamed asset 202 symbology may be generic across various types of unmanned aerial systems.

As described further herein, an objective (e.g., current or future objectives) may include, but are not limited to, one or more of fly-to, marshal, surveillance, tracking, reverse course, or kinetic attack of one or more of a person, an object, or a location.

Displayed with the unmanned teamed asset 202 is a current objective 204 associated with the unmanned teamed asset 202. A current flight path 206 may also be displayed. The current flight path 206 may depict a flight path which the unmanned teamed asset 202 is currently taking to the current objective 204. As depicted, the current flight path 206 may be represented by a solid line, although this is not intended to be a limitation of the present disclosure. For example, a current flight path 206*a* may connect the unmanned teamed asset 202*a* with the current objective 204*a* and a current flight path 206*b* may connect the unmanned teamed asset 202*b* with the current objective 204*b*.

In embodiments, one or more future objectives 208 associated with the teamed assets 202 may be displayed. One or more future flight paths 210 may also be displayed. The future objectives 208 may be carried out by the associated unmanned teamed asset 202 after the current objective 204. The future flight paths 210 may indicate future flight paths taken by the unmanned teamed assets 202, such as, but not limited to, connecting the current objective 204 with the future objective 208, or connecting two future objectives 208. The operator may visually determine a sequence in which the unmanned teamed assets 202 may operate based on the current objective 204, the current flight path 206, the future objective(s) 208, and the future flight path(s) 210. As may be understood, the unmanned teamed assets 202 may have any number of future objectives 208 and similarly a corresponding number of future flight paths 210. For example, the unmanned teamed asset 202*a* may carry out the current objective 204*a*, the future objective 208*a*-1, and the future objective 208*a*-2, in sequence. For example, the unmanned teamed asset 202*a* may fly-to the current objective 204*a* by the current flight path 206*a*, fly-to the future objective 208*a*-1 by the future flight path 210*a*-1, and fly-to the future objective 208*a*-2 by the future flight path 210*a*-2. In embodiments, the future flight paths 210 of the unmanned teamed assets 202 may be represented with a different line type than the current flight paths 206 to provide a visual indication of the current flight paths 210. For example, the current flight paths 206*a*, 206*b* may be represented by a solid line and the future flight paths 210*a*-1, 210*a*-2, 210*b*-1, 210*b*-2, may be represented by a dashed line.

As a number of unmanned teamed assets 202 or a number of future objectives 208 displayed on the touchscreen display 102 increases, the operator may have difficulty in visually determining which unmanned teamed assets 202 are assigned to the current objectives 204 or the future objectives 208. The difficulty in determining which unmanned teamed assets 202 are assigned to which future objectives 208 is accentuated where the unmanned teamed assets 202 share a team objective or where objectives prior to the future objective 208 otherwise overlap in space. In embodiments, the unmanned teamed assets 202 may share team objectives, such as the current objective 204 or the future objective 208. For example, FIG. 2, depicts the unmanned teamed assets 202*a*, 202*b* sharing the future objective 208*a*-1, 208*b*-1. As depicted, the future flights paths 210*a*-1, 210*b*-1 may intersect at the future objective 208*a*-1, 208*b*-1. The operator may then be unable to visually determine that the flight path 210*a*-2 and the future objective 208*a*-2 is associated with the unmanned teamed asset 202*a*.

Unmanned teamed asset cards 212 may be displayed by the touchscreen display 102. The unmanned teamed asset cards 212 may be associated with the unmanned teamed assets. For example, unmanned teamed asset card 212*a* may be associated with the unmanned teamed asset 202*a* and the unmanned teamed asset card 212*b* may be associated with the unmanned teamed asset 202*b*. The unmanned teamed asset cards may be displayed on the touchscreen display 102 in a panel 213. For example, the panel 213 may be disposed along any suitable portion of the touchscreen display 102, such as, but not limited to, along a top portion. The unmanned teamed asset cards 212 may include symbology, such as, but not limited to, a connection indicator 214, a symbol 216 indicating a type of the unmanned teamed asset 202, a call sign 218, an objective 220, a bearing indicator 222, or an altitude 224. In embodiments, the touchscreen display 102 is configured to receive a user input from the operator selecting one of the unmanned teamed asset cards 212. For example, the unmanned teamed asset cards 212 may be defined by a shape, such as, but not limited to, a square or a rectangle, by which a user input may be received. The shape of the unmanned teamed asset cards 212 may further include a background color for providing a visual distinction of the unmanned teamed asset card 212.

The touchscreen display 102 is not intended to be limited by the symbology depicted. In this regard, any number of unmanned teamed assets 202 and associated current objectives 204, current flight paths 206, future objectives 208, future flight paths 210, and unmanned teamed assets cards 212 may be included on the touchscreen display 102. For example, from two to five unmanned teamed assets 202 may be displayed on the touchscreen display 102. Furthermore, the touchscreen display 102 may additionally display various other symbology on the graphical user interface, such as an area of land or sea showing physical features (e.g., lakes, rivers, ground topology), cities, or roads.

Figure 3:
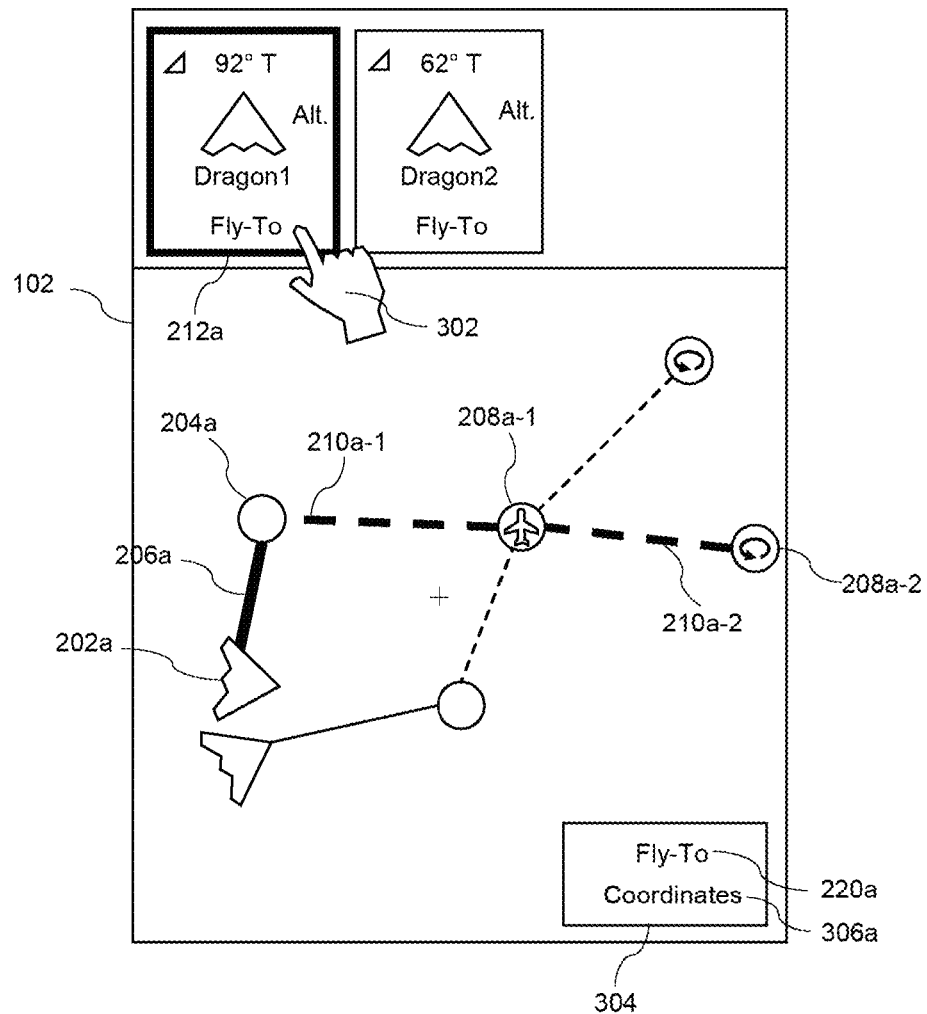
FIG. 3 depicts a graphical user interface of a display, in accordance with one or more embodiments of the present disclosure.

Referring now to FIG. 3, a graphical user interface 300 displayed by the touchscreen display 102 is described, in accordance with one or more embodiments of the present disclosure. The touchscreen display 102 may be configured to receive a user input 302. By the user input 302, the operator may select an unmanned teamed asset 202 from multiple unmanned teamed assets displayed on the touchscreen display 102. The user input 302 may include a selection of symbology depicted on the graphical user interface, such as, but not limited to, the unmanned teamed asset 202, the current objective 204, the current flight path 206, the future objective(s) 208, the future flight path(s) 210, or the unmanned teamed asset card 212. For example, the unmanned teamed asset card 212a is depicted as receiving the user input 302. The user input 302 may be communicated from the touchscreen display 102 to the processor 106.

In response to receiving the user input, the processor 106 may be configured to emphasize symbology associated with the selected unmanned teamed asset. In response to receiving the user input, the processor 106 may be configured to emphasize various symbology associated with the selected unmanned teamed asset on the touchscreen display. The symbology to be emphasized may include, but is not limited to, the unmanned teamed asset 202, the current objective 204, the current flight path 206, the future objective(s) 208, the future flight path(s) 210, or the unmanned teamed asset card 212. The symbology may be emphasized by any suitable method, such as, but not limited to, changing a color, changing a line weight (e.g., increasing or decreasing the line weight), or changing a line type. By the emphasis, the user may visually determine which unmanned teamed asset is selected and also visually determine the associated flight path for the selected unmanned teamed asset. Emphasis of the current flight path 206 and the future flight path 210 may be particularly advantageous in allowing an operator of the computer apparatus to visually determine a route taken by the selected unmanned team asset after a team objective. For example, the unmanned teamed asset 202a and the unmanned teamed asset 202b may share a team objective 208a-1, 208b-1. The unmanned teamed asset 202a may be selected and various symbology associated with the unmanned teamed asset 202a may be emphasized by a larger line weight, such as, the current flight path 206a, the future flight paths 210a-1, 210a-2, and the unmanned teamed asset card 212a. By the emphasis of the symbology associated with the unmanned teamed asset 202a, a visual determination may be made that the current flight path 210a-2 subsequent to the future objective 208a-1 is associated with the unmanned teamed asset 202a, even where the future objective 208a-1 and the future objective 208b-1 overlap in space.

In embodiments, symbology associated with the unmanned teamed assets may remain displayed on the touchscreen display while the symbology associated with the selected unmanned teamed asset is emphasized. In this regard, the operator may visually determine team routing of the various unmanned teamed assets. Determining team routing is advantageous where symbology for more than two unmanned teamed assets are displayed, as an operator may have trouble efficiently determining the team routing without all unmanned teamed asset flight paths being displayed concurrently. For example, the unmanned teamed asset 202a is selected and the current flight path 206a, the future flight paths 210a-1, 210a-2, and the unmanned teamed asset card 212a are emphasized. The unmanned teamed asset 202b is not selected. The current flight path 206b, the future flight paths 210b-1, 210b-2, and the unmanned teamed asset card 212b may remain displayed.

In embodiments, the processor is configured to display a route info box 304 associated with the selected unmanned teamed asset. The route info box 304 may include various symbology associated with the selected unmanned teamed asset, such as, but not limited to, the current objective 220 (e.g., current objective 220a) or coordinates (e.g., coordinates 306a). The route info box 304 may be displayed in any suitable portion of the touchscreen display 102, such as, but not limited to a top, bottom, left, right, or some combination thereof (e.g., a bottom right portion, as depicted). In embodiments, the coordinates may include global positioning system (GPS) coordinates. For example, the coordinates may be associated with at least one of the current objective 204 or the current position of the selected unmanned teamed asset.

In embodiments, the graphical user interface 300 displayed on the touchscreen display 102, may be centered on the selected unmanned teamed asset 202 (not depicted). The touchscreen display 102 may remain centered on the selected unmanned teamed asset 202 as the selected unmanned teamed asset moves between objectives (e.g., in a locked view). Depending upon a size of the touchscreen display 102 and coordinates of the unmanned teamed assets 202, of the current objective 204, and of the future objectives 208, when the graphical user interface is centered on the selected unmanned teamed asset, various symbology may be outside of a display size provided by the touchscreen display. In embodiments, a scale of the graphical user interface may be adjusted such that one or more of the unmanned teamed assets 202, the current objective 204, and the future objective 208 remain displayed on the touchscreen display 102. The scale may be adjusted in response to a determination by the processor 106 that not all symbology is on the touchscreen display 102.

Figure 4:
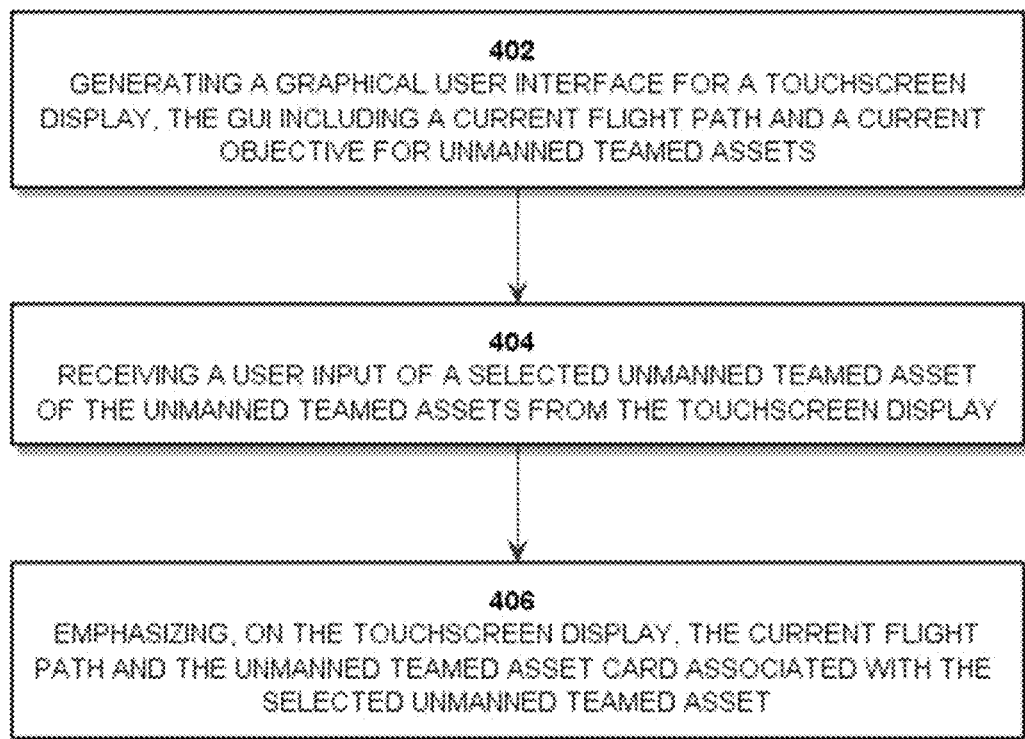
FIG. 4 depicts a flow diagram of a method, in accordance with one or more embodiments of the present disclosure.

Referring now to FIG. 4, a method 400 is disclosed, in accordance with one or more embodiments of the present disclosure. The embodiments and the enabling technologies described previously herein in the context of the computer apparatus 100 should be interpreted to extend to the method 400. It is further recognized, however, that the method 400 is not limited to the computer apparatus 100.

In a step 402, a graphical user interface is generated for a touchscreen display. The graphical user interface may include symbology associated with each of a plurality of unmanned teamed assets. The symbology may include a current objective, a current flight path between a current position of an associated unmanned teamed asset and the current objective, one or more future objectives, one or more future flight paths, and an unmanned teamed asset card. For example, a processor may receive information associated with the unmanned teamed assets from a communication interface, and, based on the information received, generate the graphical user interface by executing one or more program instructions maintained on a memory.

In a step 404, a user input of a selected unmanned teamed asset of the plurality of unmanned teamed assets may be received from the touchscreen display. For example, the processor may receive the user input from the touchscreen display by a communication bus. The user input may include one or more of selecting the current flight path, the future flight path, or the unmanned teamed asset card.

In a step 406, the current flight path and the unmanned teamed asset card associated with the selected unmanned teamed asset may be emphasized on the touchscreen display. For example, the processor may, in response to receiving the user input, update the graphical user interface to emphasize one or more of the current flight path, the future flight path, and the unmanned teamed asset card. The emphasis may include changing a color of one or more of the current flight path, the future flight path, and the unmanned teamed asset card. The symbology associated with the unmanned teamed assets may remain displayed on the touchscreen display while the current flight path and the unmanned teamed asset card are emphasized. In this regard, the touchscreen display may provide team routing while also providing enhanced awareness of a specific unmanned teamed asset.

What is claimed:

1. A computer apparatus comprising:
   at least one processor;
   a communication interface coupled with the processor, the communication interface configured to receive information regarding a plurality of unmanned teamed assets and transmit the information to the at least one processor;
   a touchscreen display in communication with the processor; and
   a memory in communication with the processor, the memory storing processor executable code for configuring the at least one processor to:
     generate a graphical user interface for the touchscreen display, the graphical user interface including symbology associated with each of the plurality of unmanned teamed assets, the symbology including a current objective and a current flight path for each of the plurality of unmanned teamed assets;
     receive, by the touchscreen display, a user input of a selected unmanned teamed asset of the plurality of unmanned teamed assets;
     emphasize, in response to the user input, at least the current flight path associated with the selected unmanned teamed asset on the touchscreen display, wherein the symbology associated with the plurality of unmanned teamed assets remains displayed on the touchscreen display while the at least the current flight path associated with the selected unmanned teamed asset is emphasized;
     center the graphical user interface on the selected unmanned teamed asset in response to receiving the user input of the selected unmanned teamed asset;
     determine that at least one of the plurality of unmanned teamed assets or at least one of the current objectives are not displayed on the touchscreen display after centering the graphical user interface; and
     adjust a scale of the graphical user interface so that the plurality of unmanned teamed assets and the current objectives are displayed on the touchscreen display.

2. The computer apparatus of claim 1, wherein the symbology further includes at least one future objective and at least one future flight path for each of the plurality of unmanned teamed assets.

3. The computer apparatus of claim 2, wherein the user input includes at least one of selecting the current flight path associated with the selected unmanned teamed asset or the at least one future flight path associated with the selected unmanned teamed asset.

4. The computer apparatus of claim 3, wherein the processor is further configured to emphasize the at least one future flight path associated with the selected unmanned teamed asset in response to the user input.

5. The computer apparatus of claim 1, wherein the graphical user interface further includes a panel including a plurality of unmanned teamed asset cards associated with the plurality of unmanned teamed assets, wherein the user input includes selecting the unmanned teamed asset card associated with the selected unmanned teamed asset.

6. The computer apparatus of claim 1, wherein the processor is further configured to display a route info box including information associated with the selected unmanned teamed asset in response to receiving the user input.

7. The computer apparatus of claim 6, wherein the information displayed by the route info box comprises at least the current objective and a coordinate of the selected unmanned teamed asset.

8. The computer apparatus of claim 1, wherein the processor is configured to emphasize at least the current flight path associated with the selected unmanned teamed asset by changing a color of the at least the current flight path.

9. A method comprising:
   generating a graphical user interface for a touchscreen display, the graphical user interface including symbology associated with each of a plurality of unmanned teamed assets, the symbology including a current objective and a current flight path for each of the plurality of unmanned teamed assets;
   receiving a user input of a selected unmanned teamed asset of the plurality of unmanned teamed assets from the touchscreen display;
   emphasizing at least the current flight path associated with the selected unmanned teamed asset on the touchscreen display, wherein the symbology associated with each of the plurality of unmanned teamed assets remains displayed on the touchscreen display while the at least the current flight path associated with the selected unmanned teamed asset is emphasized;
   centering the graphical user interface on the selected unmanned teamed asset in response to receiving the user input of the selected unmanned teamed asset;
   determining that at least one of the plurality of unmanned teamed assets or at least one of the current objectives are not displayed on the touchscreen display after centering the graphical user interface; and
   adjusting a scale of the graphical user interface so that the plurality of unmanned teamed assets and the current objectives are displayed on the touchscreen display.

10. The method of claim 9, wherein the symbology further includes at least one future objective and at least one future flight path associated with each of the plurality of unmanned teamed assets.

11. The method of claim 10, wherein the user input includes at least one of selecting the current flight path or selecting the at least one future flight path.

12. The method of claim 9, wherein the current flight path associated with the selected unmanned teamed asset is emphasized by changing a color of the current flight path on the touchscreen display.

13. The method of claim 9, wherein the graphical user interface further includes a panel including a plurality of unmanned teamed asset cards associated with the plurality of unmanned teamed assets, wherein the user input includes selecting the unmanned teamed asset card associated with the selected unmanned teamed asset.

\* \* \* \* \*